United States Patent [19]

Hassick et al.

[11] Patent Number: 5,035,808
[45] Date of Patent: Jul. 30, 1991

[54] FLOCCULATION OF SUSPENDED SOLIDS FROM AQUEOUS SOLUTIONS

[75] Inventors: Denis E. Hassick, Monroeville; Joseph P. Miknevich, Coraopolis, both of Pa.

[73] Assignee: Calgon Corporation, Pittsburgh, Pa.

[21] Appl. No.: 405,907

[22] Filed: Sep. 12, 1989

Related U.S. Application Data

[63] Continuation of Ser. No. 207,353, Jun. 15, 1988, abandoned, which is a continuation of Ser. No. 22,180, Mar. 5, 1987, abandoned.

[51] Int. Cl.$^5$ ............................................... C02F 1/54
[52] U.S. Cl. .................................. 210/728; 210/735; 210/736; 252/181

[58] Field of Search ................ 252/181, 175; 210/723, 210/728, 727, 735, 736

[56] References Cited

U.S. PATENT DOCUMENTS 4,450,092 5/1984 Huang .................................. 252/181

Primary Examiner—Paul Lieberman
Assistant Examiner—Christine A. Skane
Attorney, Agent, or Firm—W. C. Mitchell; J. F. DiPrima

[57] ABSTRACT

The use as flocculants of ferric salt/water-soluble cationic polymer compositions having inorganic:polymer weight ratios of at least 5:1 is disclosed. These compositions are especially effective in low turbidity waters.

6 Claims, No Drawings

FLOCCULATION OF SUSPENDED SOLIDS FROM AQUEOUS SOLUTIONS

This is a continuation, of application Ser. No. 207,353, filed Jun. 15, 1988 now abandonned, which is a continuation of application Ser. No. 022,180 filed on Mar. 5, 1987 now abandonned.

BACKGROUND OF THE INVENTION

This invention relates to methods of flocculating, accelerating the rate of flocculation and/or accelerating the settling of solids which are suspended in aqueous media by addition thereto of a flocculating composition.

U.S. Pat. No. 4,450,092 discloses compositions useful for coagulating finely divided solids in turbid waters. These compositions are prepared by mixing inorganic water-soluble compounds such as aluminum chloride, aluminum sulfate, ferric chloride and ferric sulfate with a polymer of diallyl dimethyl ammonium chloride having a molecular weight of at least 2,000. The weight ratio of the inorganic component to the organic component ranges from 0.75:1 to about 4:1.

U.S. Pat. No. 4,582,627 discloses flocculating agents which are reaction products of sulfate ion-containing polymeric aluminum hydroxy chloride and one or more cationic polymers such as polyacrylic amide, polyamide amine and polyethylene imine.

U.S. Pat. No. 4,137,165 discloses the use of low molecular weight acrylamide polymers which contain quaternized dimethylamino methyl groups for clarification of turbid waters.

U.S. Pat. No. 3,489,681 discloses the use of water-soluble copolymers of diacetone acrylamide as flocculating agents.

The term flocculation, as used herein, is synonymous with the term coagulation. Flocculation refers to the settling of suspended solid particles from aqueous systems. Turbidity, as used herein, is defined as the cloudiness or haziness of a solution caused by finely suspended particles. Turbidity is measured using NTU's, (nephelometric turbidity units). As used herein, low turbidity systems are systems having a low solids concentration (on a weight basis), i.e., a solids weight percent of 0.1 or less. As a general rule, this corresponds to an approximate turbidity of 50 NTU's or less, but may vary do to nature of the solids or dissolved colored matter. High solids suspensions include those systems containing in excess of 0.1 weight percent suspended solids, which generally corresponds to a turbidity of greater than 50 NTU's. While the instant compositions are especially effective in low turbidity waters, it is not intended that their use be so restricted. In fact, the instant compositions are useful in a wide variety of raw waters and in concentrated wastewaters.

Many flocculants are known, including alum ($Al_2(SO_4)_3 X H_2O$, wherein X is about 14), poly(aluminum chloride), sodium aluminate, iron compounds such as ferric chloride and ferric sulfate, lime and various cationic organic polymers, including but not limited to poly(alkaline amines), poly(diallyl dimethyl ammonium chloride), poly(2-hydroxy propyl-1-N-methyl ammonium chlorides) and quaterized poly (N-N-dimethylaminomethacrylate). The novel compsitions of the instant invention are not, however, known or suggested in the art.

SUMMARY OF THE INVENTION

The instant invention relates to synergistic flocculation compositions comprising ferric sulfate and at least one water-soluble cationic polymer selected from the group consisting of water-soluble polyamines and water-soluble dialkyl diallyl ammonium polymers, or comprising ferric chloride and a water-soluble polyamine, wherein the ferric salt to polymer weight ratio is at least 5:1, on an active basis.

Thus, the instant method utilizes synergistic compositions comprising a ferric salt and at least one water-soluble cationic polymer to accomplish clarification objectives. The novel compositions of this invention are stable when blended together and synergistically settle fine suspended matter from aqueous systems. The instant compositions are especially effective in low-turbidity, low-alkalinity waters, but they are also effective in other waters. Low-alkalinity waters, as used herein, are waters having total alkalinity values of 150 ppm or less.

Additionally, the instant compositions are convenient to use since only one product must be added to the system being treated, instead of two or more.

DETAILED DESCRIPTION OF THE INVENTION

The instant invention relates to compositions useful for reducing turbidity in aqueous systems, which comprise: (a) ferric sulfate and (b) at least one water-soluble cationic polymer selected from the group consisting of water-soluble polyamines and water-soluble dialkyl diallyl ammonium polymers; or which comprise (a) ferric chloride and (b) a water-soluble polyamine, wherein the weight ratio of (a) to (b) is at least 5:1, and preferably ranges from 10:1 to about 100:1, most preferably 10:1 to about 30:1.

Any water soluble polyamine may be used with either ferric sulfate or ferric chloride. As used herein, the term polyamine includes any water-soluble product having the following structure:

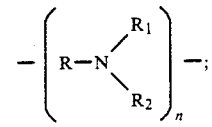

wherein $R_1$ and $R_2$, which may be the same or different, are selected from the group consisting of $C_1$–$C_8$ straight or branched alkyl, substituted $C_1$–$C_8$ straight or branched alkyl and hydrogen and wherein R is selected from the group consisting of $C_1$–$C_8$ straight or branched alkyl and substituted $C_1$–$C_8$ straight or branched alkyl, and wherein n ranges from 2 to 50,000. Preferably, the molecular weight should range from about 500 to about 200,000, as determined by gel permeation chromatography. Polymers having molecular weights ranging from about 10,000–150,000 are more preferred. The most preferred polyamines are epichlorohydrin-dimethylamine polymers.

Any water soluble di $C_1$–$C_8$ alkyl diallyl ammonium polymer can be used with ferric sulfate. The preferred polymers are polydimethyl diallyl ammonium chloride (polyDMDAAC), polydiethyldiallyl ammonium chloride (polyDEDAAC), polydimethyl diallyl ammonium bromide (polyDMDAAB) and polydiethyl diallyl ammonium bromide (polyDEDAAB). The most preferred dialkyl diallyl ammonium polymer is a homo polymer of dimethyl diallyl ammonium chloride.

It is noteworthy that compositions comprising ferric chloride and a dialkyl diallyl ammonium polymer are unstable in that they tend to form gels. Such compositions are therefore not recommended.

The molecular weight of the dialkyl diallyl ammonium polymer preferably ranges from about 1,000 to about 5,000,000, as determined by gel permeation chromatography.

The ratio of the ferric salt to cationic polymer is critical, and should be at least 5:1, by weight, on an active basis. Preferably, the ratio should range from 10:1 to about 100:1, and most preferably from 10:1 to about 30:1. These compositions synergistically reduce turbidity in aqueous systems, particularly low-turbidity, (i.e., systems containing 0.1 or less weight percent of suspended solids), low-alkalinity systems (i.e., 150 ppm or less).

The instant invention is additionally directed to a method for reducing turbidity in an aqueous system which comprises adding to said system an effective amount of a composition comprising: (a) ferric sulfate chloride; and (b) at least one cationic polymer as defined above, or comprising ferric chloride and a dialkyl diallyl ammonium chloride polymer, wherein the weight ratio of (a) to (b) is at least 5:1, preferably 10:1 to about 100:1, and most preferably 10:1 to about 30:1.

As used herein, the phrase "effective amount" refers to that amount of a ferric salt/polymer composition which is necessary to reduce turbidity in the system being treated. Generally, the effective amount will range from about 0.1 ppm of the instant compositions, on an active basis, to about 100 ppm of the instant compositions.

The key to this invention is that the inventors have discovered a synergistic relationship between ferric salts and specific cationic polymers. While use of these components, individually, is known in the art, the use of the instant compositions is not known. the synergistic benefit of the combined components, as demonstrated by the examples, is surprising and unexpected.

The instant compositions are especially effective in low turbidity, low alkalinity waters. However, the inventors do not intend that the instant compositions be restricted to use in such systems, as the instant compositions are effective flocculants in a wide range of aqueous systems.

Other important aspects of the instant invention are that the components of the compositions are compatible and that the instant compositions are stable. Additionally, the instant compositions afford the advantages of using one product instead of many products.

Preferably, the instant compositions are applied as aqueous solutions. Thus, a ferric salt/cationic polymer composition is added to water, forming an aqueous solution. The maximum weight percent of the composition in water depends upon its solubility limit; generally, however, it is preferred that the aqueous solution contain from about 0.1 to about 20%, by weight, of the instant aluminum chloride/cationic polymer composition, wherein the weight ratio of ferric salt to cationic polymer is at least 5:1, on an active basis.

EXAMPLES

The following examples demonstrate the invention in greater detail. These examples are not intended to limit the scope of the invention in any way.

In the examples, the following products were used:

Ferric chloride is a 40% active (weight basis) solution available from B.V.S. Chemical Co., Wyandotte, Mich.

Ferric sulfate is a 50% active aqueous solution available from Tennessee Chemical Company as Ferri-Floc.

Alum is a 50% active aqueous solution of aluminum sulfate, $Al_2(SO_4)_3 \cdot 14 H_2O$.

High MW PolyDMDAAC is 20 weight % active polydimethyl diallyl ammonium chloride (MW=1,000,000–2,000,000), available from Calgon Corporation as Cat-Floc L.

Medium MW Poly DMDAAC is 20 weight % active polydimethyl diallyl ammonium chloride (MW=150,000±50,000), available from Calgon Corporation as Cat-Floc TL.

Low MW Poly DMDAAC is 30 weight % active polydimethyl dially ammonium chloride (MW=3,000–4,000), available from Calgon Corporation as Varikem 110.

Dry Poly DMDAAC is 100% active polydimethyl diallyl ammonium chloride (MW=approximately 200,000), available from Calgon Corporation as E-921.

High MW Polymaine is a 50 weight % active epichlorhydrin -dimethylamine polymer (MW=100,000), available from American Cyanamid as CA-260.

Low MW Polyamine is a 50 weight % active epichlorohydrin dimethylamine polymer (MW=20,000), available from American Cyanamid as CA-250.

Alum/Medium MW Poly DMDAAC (5:1) is Cat Floc K-5, available from Calgon Corporation, which is 5 parts, by weight, a 50% alum solution (by weight) and 1 part Catfloc C, a 40%, by weight, active polyDMDAAC having a molecular weight of approximately 150,000.

Alum/Medium MW Poly DMDAAC (10:1) is Cat Floc K-10, available from Calgon Corporation, which is 10 parts, by weight, a 50% alum solution (by weight) and 1 part Catfloc C, a 40%, by weight, active polyDMDAAC having a molecular weight of approximately 150,000.

EXAMPLES 1–30

In Examples 1–30, jar tests were run on Watauga River water having an initial turbidity of 4.0–4.5 NTU's. The water had a total alkalinity of 60–70 ppm.

The jar tests were run under the following conditions:
1 min @ 100 rpm
20 min @ 45 rpm
10 min @ 0 rpm After a 10 minute settling period, 30 ml samples of supernatant were drawn, and turbidity was measured using a Bausch & Lomb Mini-20 Spectrophotometer/-Nephelometer.

For filtration index measurements, 100 ml samples of supernatant were drawn, and the time was measured for each 100 ml sample to pass through a sheet of 0.3 micron filter paper. The filtration index values were then calculated by dividing the time obtained by the time required for 100 mls of deionized water to pass through a sheet of 0.3 micron filter paper.

Results are shown in Table I.

TABLE I

| Example Number | Flocculant | As Product Dosage (ppm) | Supernatant Clarity (NTU'S) (10 min.) | Filtration Index |
|---|---|---|---|---|
| 1* | Alum | 10 | 4.4 | — |
| 2* | Alum | 15 | 4.0 | 2.37 |
| 3* | Alum | 20 | 3.7 | 2.30 |
| 4* | Alum | 30 | 2.4 | 2.22 |
| 5* | Alum | 40 | 2.4 | — |
| 6* | Alum | 50 | 2.9 | — |
| 7* | Alum/DMDAAC (10:1)+ | 10 | 4.3 | — |
| 8* | Alum/DMDAAC (10:1) | 15 | 3.6 | — |
| 9* | Alum/DMDAAC (10:1) | 20 | 2.9 | 1.93 |
| 10* | Alum/DMDAAC (10:1) | 25 | 2.3 | — |
| 11* | Ferric Chloride | 10 | 4.2 | — |
| 12* | Ferric Chloride | 15 | 3.45 | — |
| 13* | Ferric Chloride | 20 | 1.3 | — |
| 14* | Ferric Chloride | 30 | 0.75 | — |
| 15* | Ferric Sulfate | 10 | 4.9 | — |
| 16* | Ferric Sulfate | 15 | 3.0 | — |
| 17* | Ferric Sulfate | 20 | 2.7 | — |
| 18* | Ferric Sulfate | 30 | 1.4 | — |
| 19* | Ferric Sulfate | 40 | 0.95 | — |
| 20* | Ferric Sulfate | 50 | 0.85 | — |
| 21* | Ferric Sulfate | 60 | 0.95 | — |
| 22* | Ferric Sulfate | 100 | 1.8 | — |
| 23 | Ferric Chloride/Low MW Polyamine (10:1) | 10 | 2.2 | — |
| 24 | Ferric Chloride/Low MW Polyamine (10:1) | 15 | 0.95 | 1.30 |
| 25 | Ferric Chloride/Low MW Polyamine (10:1) | 20 | 0.85 | — |
| 26 | Ferric Chloride/Low MW Polyamine (10:1) | 30 | 0.6 | — |
| 27 | 50% Ferric Sulfate/Low MW Polyamine (10:1) | 10 | 4.4 | — |
| 28 | 50% Ferric Sulfate/Low MW Polyamine (10:1) | 15 | 1.35 | 1.37 |
| 29 | 50% Ferric Sulfate/Low MW Polyamine (10:1) | 20 | 0.95 | — |
| 30 | 50% Ferric Sulfate/Low MW Polyamine (10:1) | 30 | 0.85 | — |

*Comparison example
+Composition ratios in this table are on a product:product (as product) basis.

What is claimed is:

1. A method for reducing the turbidity of an aqueous system comprising adding to said system an effective amount of a composition comprising:
   (a) ferric sulfate; and
   (b) at least one water-soluble polymer selected from the group consisting of:
      (i) water-soluble polyamines represented by structure I

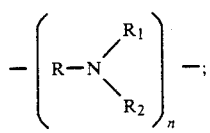

wherein $R_1$ and $R_2$, which may be the same or different, are selected from the group consisting of straight or branched $C_1$-$C_8$ alkyl, substituted straight or branched $C_1$-$C_8$ alkyl and hydrogen; wherein R is selected from the group consisting of straight or branched $C_1$-$C_8$ alkyl and substituted straight or branched $C_1$-$C_8$ alkyl; and wherein n ranges from 2-50,000; and
      (ii) water-soluble $C_1$-$C_8$ dialkyl diallyl ammonium polymers;
or comprising (a) ferric chloride; and (b) said water-soluble polyamine with structure (I); wherein the ratio (a) : (b), on a weight basis, is at least 5:1.

2. The method of claim 1, wherein (b) is an epichlorohydrin dimethylamine polymer.

3. The method of claim 1, wherein (a) is ferric chloride and wherein (b) is selected from the group consisting of polydimethyl diallyl ammonium chloride, polydiethyl ammonium chloride, polydiethyl diallyl ammonium chloride, polydimethyl diallyl ammonium bromide and polydiethyl diallyl ammonium bromide.

4. The method of claim 3, wherein (b) is polydimethyl diallyl ammonium chloride.

5. The method of claim 1, wherein said aqueous system contains 0.1 weight percent, or less, suspended solids.

6. The method of claim 1, wherein said effective amount is from about 0.1 to about 100 ppm of said composition.

* * * * *